US009554366B2

(12) United States Patent
Anchan et al.

(10) Patent No.: US 9,554,366 B2
(45) Date of Patent: Jan. 24, 2017

(54) OPTIMIZED ALWAYS-ON WIRELESS SERVICE USING NETWORK ASSISTANCE AND KEEP-ALIVES

(71) Applicant: QUALCOMM Incorporated, San Diego, CA (US)

(72) Inventors: Kirankumar Anchan, San Diego, CA (US); Karthika Paladugu, San Diego, CA (US); Arvind V. Santhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 14/012,923

(22) Filed: Aug. 28, 2013

(65) Prior Publication Data

US 2014/0064209 A1  Mar. 6, 2014

Related U.S. Application Data

(60) Provisional application No. 61/695,764, filed on Aug. 31, 2012.

(51) Int. Cl.
*H04W 4/00* (2009.01)
*H04W 72/04* (2009.01)
*H04W 76/04* (2009.01)

(52) U.S. Cl.
CPC ....... *H04W 72/0406* (2013.01); *H04W 76/045* (2013.01)

(58) Field of Classification Search
CPC .................................................. H04W 28/04
USPC ........................................................ 370/329
See application file for complete search history.

(56) References Cited

U.S. PATENT DOCUMENTS

| 8,385,242 | B2 | 2/2013 | Huoviala et al. |
| 8,424,000 | B2 | 4/2013 | Vijay et al. |
| 2007/0140159 | A1* | 6/2007 | Eronen ............... H04L 12/12 370/328 |
| 2010/0322124 | A1* | 12/2010 | Luoma ............. H04W 72/1242 370/311 |

(Continued)

FOREIGN PATENT DOCUMENTS

WO    2012150473 A1    11/2012

OTHER PUBLICATIONS

International Search Report and Written Opinion—PCT/US2013/057389—ISA/EPO—Jan. 2, 2014.

*Primary Examiner* — Samina Choudhry
(74) *Attorney, Agent, or Firm* — Muncy, Geissler, Olds & Lowe, P.C.

(57) ABSTRACT

The disclosure generally relates to optimized always-on wireless service using network assistance and keep-alives. More particularly, in response to a user equipment (UE) requesting a bearer for an always-on service, a network may establish the bearer for the always-on service and transmit an availability time that indicates a period during which the bearer will be held in an active state to the UE. Any applications running on the UE may then use the bearer for the always-on service, and the UE may transmit a single keep-alive message to the network before the availability time expires to reset the period during which the bearer will be held in the active state. Furthermore, the keep-alive message may be structured to not generate a reply and thereby reduce battery consumption, reduce communication overhead, and improve network capacity.

26 Claims, 13 Drawing Sheets

(56) References Cited

U.S. PATENT DOCUMENTS

| | | | |
|---|---|---|---|
| 2010/0325306 A1* | 12/2010 | Vimpari | H04L 29/12471 709/233 |
| 2011/0261787 A1* | 10/2011 | Bachmann | H04L 63/029 370/331 |
| 2013/0007484 A1 | 1/2013 | Gobriel et al. | |
| 2013/0067059 A1 | 3/2013 | Gatta et al. | |

* cited by examiner

ICMP Packet 600

| | Bits 0-7 | Bits 8-15 | Bits 16-23 | Bits 24-31 |
|---|---|---|---|---|
| IP Header (20 bytes) 610 | Version / IHL 612 | Service Type 614 | Length 616 | |
| | Identification 618 | | flags and offset 620 | |
| | Time To Live (TTL) 622 | Protocol 624 | Checksum 626 | |
| | Source IP Address 628 | | | |
| | Destination IP Address 630 | | | |
| ICMP Payload (8+ bytes) 640 | Message Type > 42  642 | Code 646 | Checksum 648 | |
| | Quench 650 | | | |
| | Data 660 (optional) | | | |

*FIG. 6*

OPTIMIZED ALWAYS-ON WIRELESS SERVICE USING NETWORK ASSISTANCE AND KEEP-ALIVES

PRIORITY CLAIM UNDER 35 U.S.C. §119

The present application for Patent claims the benefit of U.S. Provisional Patent Application Ser. No. 61/695,764, entitled "OPTIMIZING ALWAYS-ON WIRELESS SERVICE FOR PUSH-TO-TALK USING NETWORK ASSISTANCE AND KEEP-ALIVES," filed Aug. 31, 2012, assigned to the assignee hereof, which is expressly incorporated herein by reference in its entirety.

TECHNICAL FIELD

Various embodiments described herein relate to optimized always-on wireless service using network assistance and keep-alives.

BACKGROUND

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

More recently, Long Term Evolution (LTE) has been developed as a wireless communications protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA).

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments disclosed herein in a simplified form to precede the detailed description presented below.

According to one exemplary aspect, the disclosure generally relates to optimized always-on wireless service using network assistance and keep-alives. More particularly, in response to a user equipment (UE) requesting a bearer for an always-on service, a network may establish the bearer for the always-on service and transmit an availability time that indicates a period during which the bearer will be held in an active state to the UE. Any applications running on the UE may then use the bearer for the always-on service, and the UE may transmit a single keep-alive message to the network before the availability time expires to reset the period during which the bearer will be held in the active state. Furthermore, the keep-alive message may be structured to not generate a reply and thereby reduce battery consumption, reduce communication overhead, and improve network capacity.

According to another exemplary aspect, a method for optimized always-on wireless service may comprise monitoring requests for always-on service from one or more applications or services on a UE that does not currently have always-on service from a network, transmitting, to the network, a message that requests a bearer dedicated to always-on service in response to receiving a request for the always-on service from at least one of the applications or services on the UE, receiving, at the UE, an availability time that indicates a period during which the bearer dedicated to the always-on service will be held in an active state, and transmitting a keep-alive message from the UE to the network before the availability time expires to reset the period during which the dedicated bearer will be held in the active state, wherein the UE maintains the state associated with the dedicated bearer and notifies the one or more applications or services on the UE to suppress keep-alive messages. For example, in one embodiment, the keep-alive message may comprise an Internet Control Messaging Protocol (ICMP) message that does not generate a reply. Furthermore, in one embodiment, the UE may transmit one keep-alive message to enable all the applications or services on the UE to utilize the bearer dedicated to the always-on service in the period during which the dedicated bearer will be held in the active state or alternatively disable keep-alive messages to deactivate the always-on service and consequently deactivate the bearer dedicated thereto in response to all applications or services that requested the always-on service indicating that the always-on service is no longer required. In the latter case, the method may further comprise transmitting a request to reactivate the bearer dedicated to the always-on service to the network in response to the UE transitioning to a high-priority state or another notification from at least one of the applications or services that requests the always-on service, wherein the UE may then receive an availability time that indicates the period during which the reactivated bearer will be held in the active state. Alternatively, the network may reactivate the bearer dedicated to the always-on service in response to receiving a high-priority call that terminates at the UE, which may then be received at the UE over the reactivated bearer.

According to another exemplary aspect, an apparatus that may be used to optimize always-on wireless service using network assistance and keep-alives may comprise means for monitoring requests for always-on service from one or more applications or services on the apparatus, which may not currently have always-on service from a network, means for transmitting, to the network, a message that requests a bearer dedicated to always-on service in response to a request for the always-on service from at least one of the applications or services on the apparatus, means for receiving an availability time that indicates a period during which the bearer dedicated to the always-on service will be held in an active state, and means for transmitting a keep-alive message to the network before the availability time expires to reset the period during which the dedicated bearer will be held in the active state, wherein the apparatus maintains the state associated with the dedicated bearer and notifies the one or more applications or services on the apparatus to suppress keep-alive messages.

According to another exemplary aspect, an apparatus that may be used to optimize always-on wireless service using network assistance and keep-alives may comprise one or more processors configured to monitor requests for always-on service from one or more applications or services on a UE that does not currently have always-on service from a network, to transmit a message that requests a bearer dedicated to always-on service to the network in response to a request for the always-on service from at least one of the applications or services on the UE, to receive an availability time that indicates a period during which the bearer dedicated to the always-on service will be held in an active state, and to transmit a keep-alive message from the UE to the network before the availability time expires to reset the period during which the dedicated bearer will be held in the active state, wherein the UE maintains the state associated with the dedicated bearer and notifies the one or more applications or services on the UE to suppress keep-alive messages. In addition, the apparatus may comprise a memory coupled to the one or more processors.

According to another exemplary aspect, a computer-readable storage medium may have computer-executable instructions that may be used to optimize always-on wireless service using network assistance and keep-alives recorded thereon, wherein executing the computer-executable instructions on one or more processors may cause the one or more processors to monitor requests for always-on service from one or more applications or services on a UE that does not currently have always-on service from a network, transmit a message that requests a bearer dedicated to always-on service to the network in response to receiving a request for the always-on service from at least one of the applications or services on the UE, receive an availability time at the UE that indicates a period during which the bearer dedicated to the always-on service will be held in an active state, and transmit a keep-alive message from the UE to the network before the availability time expires to reset the period during which the dedicated bearer will be held in the active state, wherein the UE maintains the state associated with the dedicated bearer and notifies the one or more applications or services on the UE to suppress keep-alive messages.

According to another exemplary aspect, a method for optimized always-on wireless service may comprise establishing, at a network, a bearer dedicated to an always-on service on a UE in response to receiving a request for always-on service from the UE, transmitting, to the UE, an availability time that indicates a period during which the bearer dedicated to the always-on service will be held in an active state, and resetting the period during which the dedicated bearer will be held in the active state in response to receiving a keep-alive message from the UE before the availability time expires (e.g., an ICMP message that does not generate a reply). As such, the method may further comprise routing traffic associated with one or more applications on the UE over the dedicated bearer in the period during which the dedicated bearer will be held in the active state. Additionally, in one embodiment, the method may further comprise transmitting, to the UE, an Internet Protocol (IP) address associated with a Packet Data Network Gateway (P-GW) that terminates an interface associated with the dedicated bearer, wherein an activation message associated with the dedicated bearer may include the IP address associated with the P-GW within a Protocol Configuration Option (PCO) information element. Furthermore, in one embodiment, the bearer dedicated to the always-on service may be deactivated in response to the network determining that a keep-alive message was not received before the availability time expired, wherein the bearer for the always-on service may be reactivated in response to the UE transitioning to a high-priority state or requesting activity on the bearer for the always-on service an availability time that indicates the period during which the reactivated bearer will be held in the active state may then be transmitted to the UE. Alternatively (or additionally), the bearer for the always-on service may be reactivated in response to the network receiving a high-priority call that terminates at the UE, in which case the high-priority call may be terminated at the UE over the reactivated bearer, whereas a non-priority call received at the network that terminates at the UE may be terminated at the UE over a default bearer.

According to another exemplary aspect, an apparatus that may be used to optimize always-on wireless service using network assistance and keep-alives may comprise means for establishing a bearer dedicated to an always-on service on a UE in response to a request for always-on service from the UE, means for transmitting, to the UE, an availability time that indicates a period during which the bearer dedicated to the always-on service will be held in an active state, and means for resetting the period during which the dedicated bearer will be held in the active state in response to receiving a keep-alive message from the UE before the availability time expires.

According to another exemplary aspect, an apparatus that may be used to optimize always-on wireless service using network assistance and keep-alives may comprise one or more processors configured to establish a bearer dedicated to an always-on service on a UE in response to receiving a request for always-on service from the UE, to transmit an availability time to the UE, wherein the availability time indicates a period during which the bearer dedicated to the always-on service will be held in an active state, and to reset the period during which the dedicated bearer will be held in the active state in response to receiving a keep-alive message from the UE before the availability time expires. In addition, the apparatus may comprise a memory coupled to the one or more processors.

According to another exemplary aspect, a computer-readable storage medium may have computer-executable instructions that may be used to optimize always-on wireless service using network assistance and keep-alives recorded thereon, wherein executing the computer-executable instructions on one or more processors may cause the one or more processors to establish a bearer dedicated to an always-on service on a UE in response to receiving a request for always-on service from the UE, transmit an availability time that indicates a period during which the bearer dedicated to the always-on service will be held in an active state to the UE, and reset the period during which the dedicated bearer will be held in the active state in response to receiving a keep-alive message from the UE before the availability time expires.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 6 illustrates an exemplary ICMP message that may be used for a keep-alive to optimize always-on wireless service according to one aspect of the disclosure.

DETAILED DESCRIPTION

Figure 1:
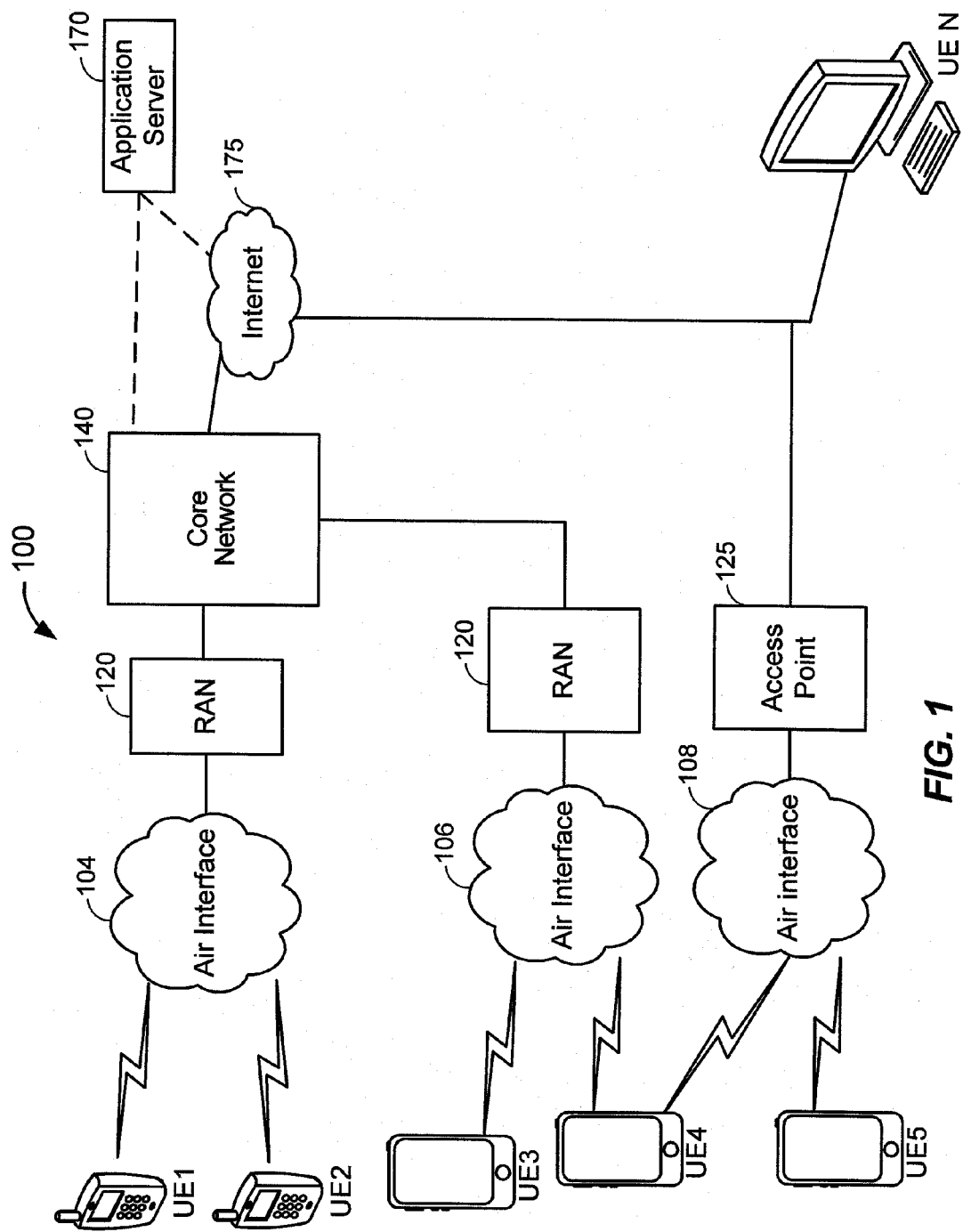
FIG. 1 illustrates a high-level system architecture of a wireless communications system according to one aspect of the disclosure.

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, Wi-Fi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 according to one aspect of the disclosure. The wireless communications system 100 contains UEs 1 ... N. The UEs 1 ... N can include cellular telephones, personal digital assistant (PDAs), pagers, a laptop computer, a desktop computer, and so on. For example, in FIG. 1, UEs 1 ... 2 are illustrated as cellular calling phones, UEs 3 ... 5 are illustrated as cellular touchscreen phones or smart phones, and UE N is illustrated as a desktop computer or PC.

Referring to FIG. 1, UEs 1 ... N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EV-DO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, Evolved Node Bs (eNodeBs or eNBs), and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of Wi-Fi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., a Wi-Fi router with wired and/or wireless connectivity may correspond to the access point 125).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Examples of protocol-specific implementations for the RAN 120 and the core network 140 are provided below with respect to FIGS. 2A through 2D to help explain the wireless communications system 100 in more detail. In particular, the components of the RAN 120 and the core network 140 corresponds to components associated with supporting packet-switched (PS) communications, whereby legacy circuit-switched (CS) components may also be present in these networks, but any legacy CS-specific components are not shown explicitly in FIGS. 2A-2D.

Figure 2A:
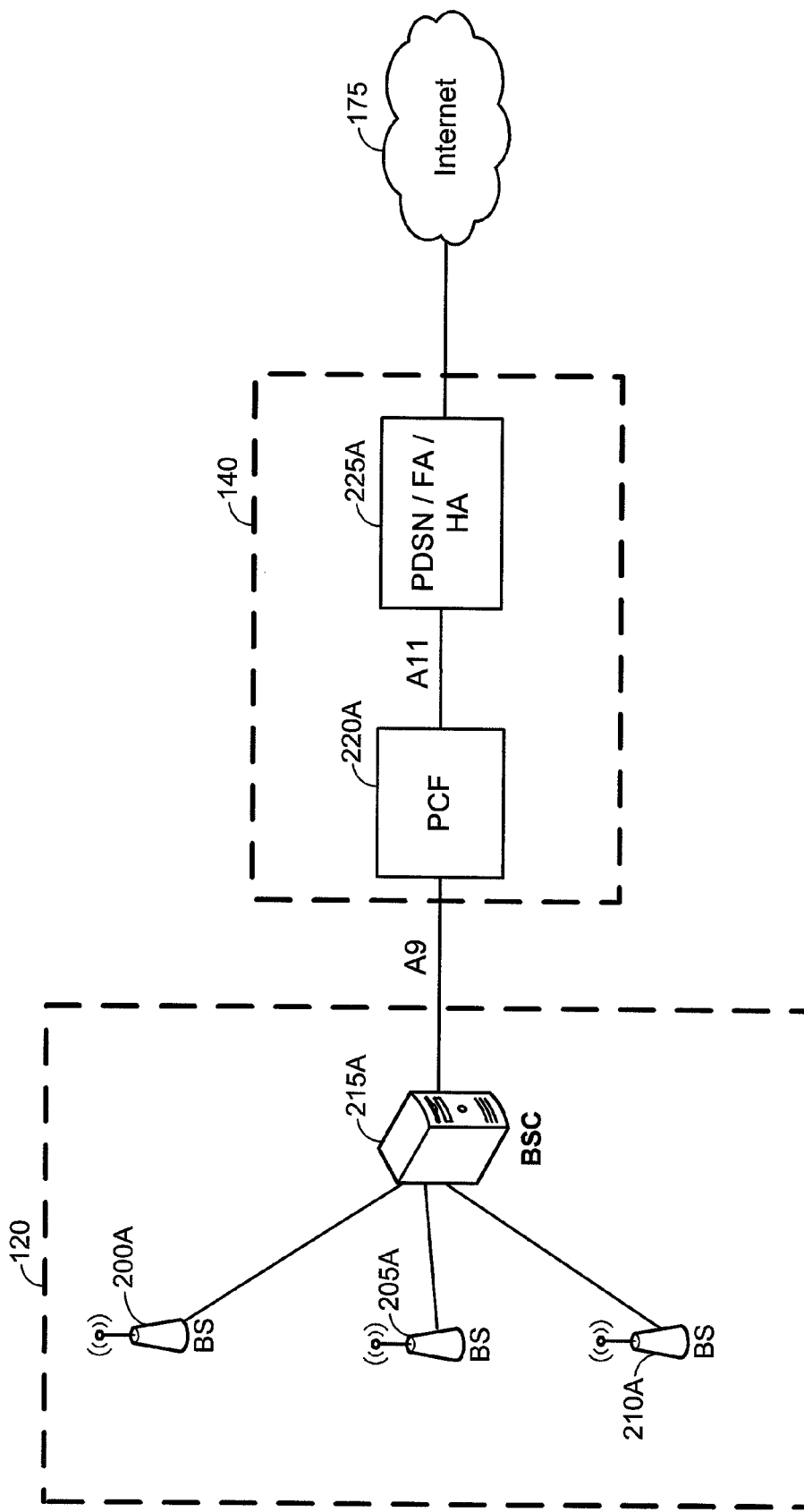
FIG. 2A illustrates an example configuration of a radio access network (RAN) and a packet-switched portion of a core network for a 1×EV-DO network according to one aspect of the disclosure.

FIG. 2A illustrates an example configuration of the RAN 120 and the core network 140 for packet-switched communications in a CDMA2000 1× Evolution-Data Optimized (EV-DO) network according to one aspect of the disclosure. Referring to FIG. 2A, the RAN 120 includes a plurality of base stations (BSs) 200A, 205A and 210A that are coupled to a base station controller (BSC) 215A over a wired backhaul interface. A group of BSs controlled by a single BSC is collectively referred to as a subnet. As will be appreciated by one of ordinary skill in the art, the RAN 120 can include multiple BSCs and subnets, and a single BSC is shown in FIG. 2A for the sake of convenience. The BSC 215A communicates with a packet control function (PCF) 220A within the core network 140 over an A9 connection. The PCF 220A performs certain processing functions for the BSC 215A related to packet data. The PCF 220A communicates with a Packet Data Serving Node (PDSN) 225A within the core network 140 over an A11 connection. The PDSN 225A has a variety of functions, including managing Point-to-Point (PPP) sessions, acting as a home agent (HA) and/or foreign agent (FA), and is similar in function to a Gateway General Packet Radio Service (GPRS) Support Node (GGSN) in GSM and UMTS networks (described below in more detail). The PDSN 225A connects the core network 140 to external IP networks, such as the Internet 175.

Figure 2B:
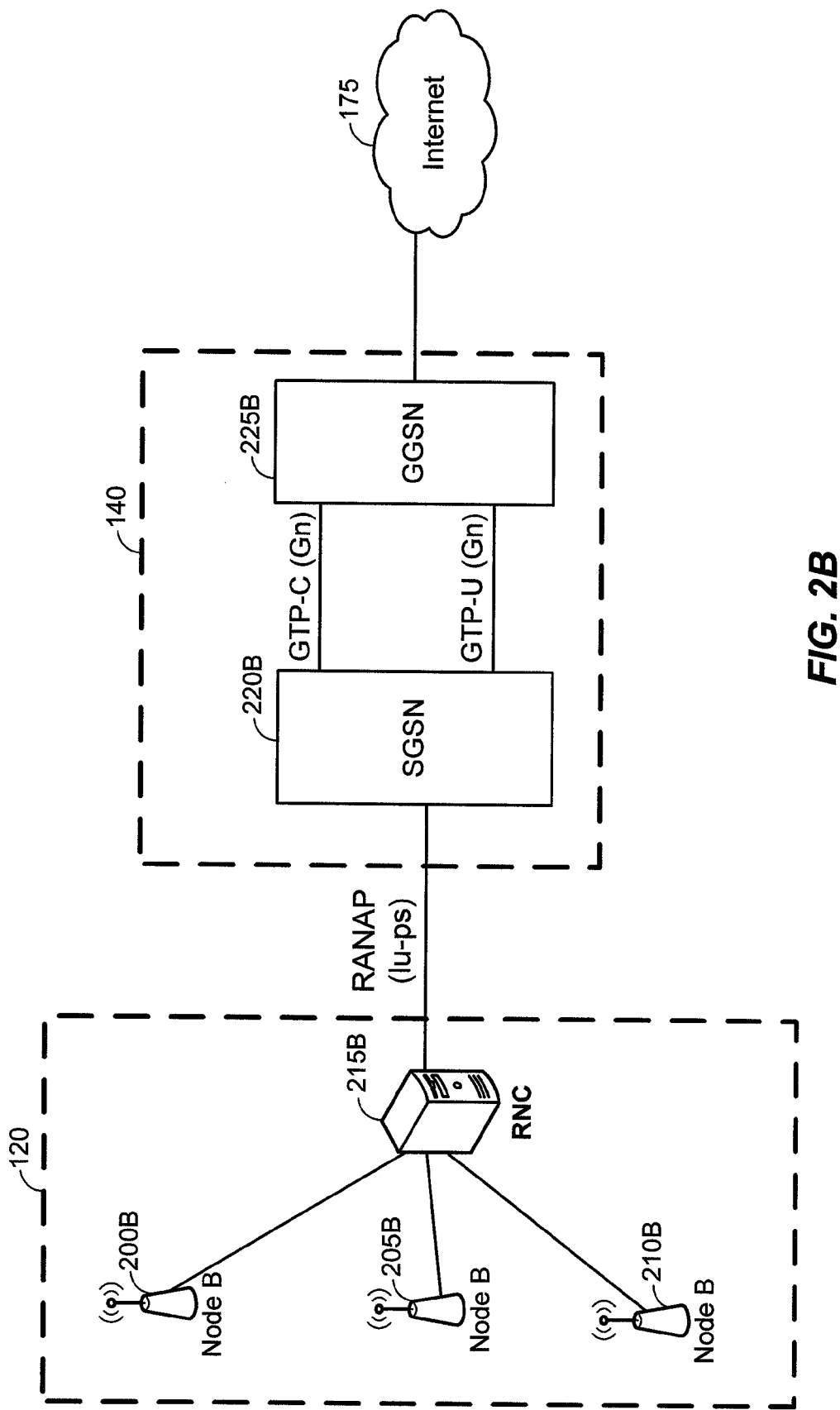
FIG. 2B illustrates an example configuration of the RAN and a packet-switched portion of a General Packet Radio Service (GPRS) core network within a 3G UMTS W-CDMA system according to one aspect of the disclosure.

FIG. 2B illustrates an example configuration of the RAN 120 and a packet-switched portion of the core network 140 that is configured as a GPRS core network within a 3G UMTS W-CDMA system according to one aspect of the disclosure. Referring to FIG. 2B, the RAN 120 includes a plurality of Node Bs 200B, 205B and 210B that are coupled to a Radio Network Controller (RNC) 215B over a wired backhaul interface. Similar to 1×EV-DO networks, a group of Node Bs controlled by a single RNC is collectively referred to as a subnet. As will be appreciated by one of ordinary skill in the art, the RAN 120 can include multiple RNCs and subnets, and a single RNC is shown in FIG. 2B for the sake of convenience. The RNC 215B is responsible for signaling, establishing and tearing down bearer channels (i.e., data channels) between a Serving GRPS Support Node (SGSN) 220B in the core network 140 and UEs served by the RAN 120. If link layer encryption is enabled, the RNC 215B also encrypts the content before forwarding it to the RAN 120 for transmission over an air interface. The function of the RNC 215B is well-known in the art and will not be discussed further for the sake of brevity.

In FIG. 2B, the core network 140 includes the above-noted SGSN 220B (and potentially a number of other SGSNs as well) and a GGSN 225B. Generally, GPRS is a protocol used in GSM for routing IP packets. The GPRS core network (e.g., the GGSN 225B and one or more SGSNs 220B) is the centralized part of the GPRS system and also provides support for W-CDMA based 3G access networks. The GPRS core network is an integrated part of the GSM core network (i.e., the core network 140) that provides mobility management, session management, and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the Internet 175 as if from one location at the GGSN 225B. This is achieved by transferring the respective UE's data from the UE's current SGSN 220B to the GGSN 225B, which is handling the respective UE's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2B, the GGSN 225B acts as an interface between a GPRS backbone network (not shown) and the Internet 175. The GGSN 225B extracts packet data with associated a packet data protocol (PDP) format (e.g., IP or PPP) from GPRS packets coming from the SGSN 220B, and sends the packets out on a corresponding packet data network. In the other direction, the incoming data packets are directed by the GGSN connected UE to the SGSN 220B which manages and controls the Radio Access Bearer (RAB) of a target UE served by the RAN 120. Thereby, the GGSN 225B stores the current SGSN address of the target UE and its associated profile in a location register (e.g., within a PDP context). The GGSN 225B is responsible for IP address assignment and is the default router for a connected UE. The GGSN 225B also performs authentication and charging functions.

The SGSN 220B is representative of one of many SGSNs within the core network 140, in an example. Each SGSN is responsible for the delivery of data packets from and to the UEs within an associated geographical service area. The tasks of the SGSN 220B includes packet routing and transfer, mobility management (e.g., attach/detach and location management), logical link management, and authentication and charging functions. The location register of the SGSN 220B stores location information (e.g., current cell, current VLR) and user profiles (e.g., IMSI, PDP address(es) used in the packet data network) of all GPRS users registered with the SGSN 220B, for example, within one or more PDP contexts for each user or UE. Thus, SGSNs 220B are responsible for (i) de-tunneling downlink GTP packets from the GGSN 225B, (ii) uplink tunnel IP packets toward the GGSN 225B, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in UMTS system architecture) communicates with the SGSN 220B via a Radio Access Network Application Part (RANAP) protocol. RANAP operates over an Iu interface (Iu-ps), with a transmission protocol such as Frame Relay or IP. The SGSN 220B communicates with the GGSN 225B via a Gn interface, which is an IP-based interface between SGSN 220B and other SGSNs (not shown) and internal GGSNs (not shown), and uses the GTP protocol defined above (e.g., GTP-U, GTP-C, GTP', etc.). In the embodiment of FIG. 2B, the Gn between the SGSN 220B and the GGSN 225B carries both the GTP-C and the GTP-U. While not shown in FIG. 2B, the Gn interface is also used by the Domain Name System (DNS). The GGSN 225B is connected to a Public Data Network (PDN) (not shown), and in turn to the Internet 175, via a Gi interface with IP protocols either directly or through a Wireless Application Protocol (WAP) gateway.

Figure 2C:
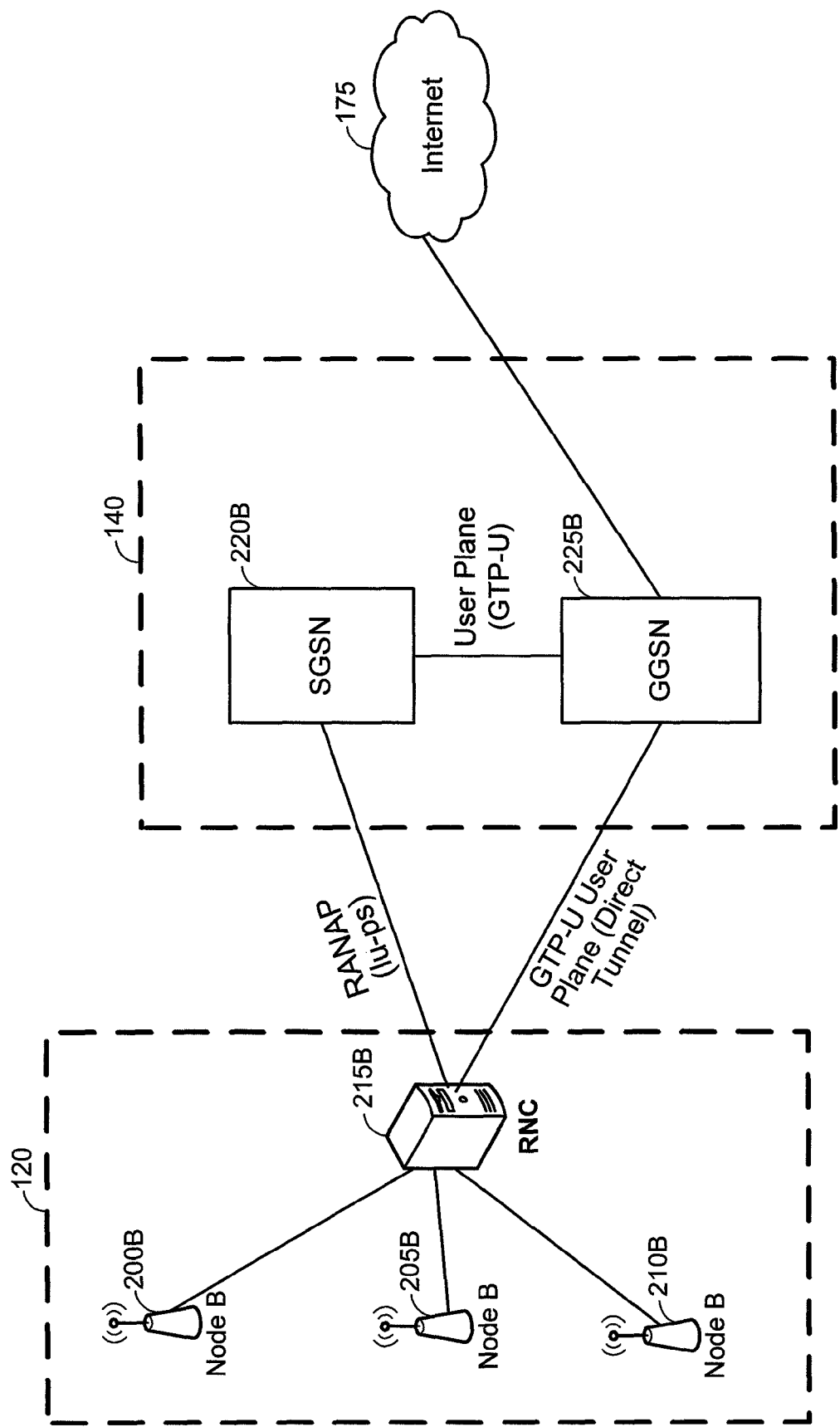
FIG. 2C illustrates another example configuration of the RAN and a packet-switched portion of a GPRS core network within a 3G UMTS W-CDMA system according to one aspect of the disclosure.

FIG. 2C illustrates another example configuration of the RAN 120 and a packet-switched portion of the core network 140 that is configured as a GPRS core network within a 3G UMTS W-CDMA system according to one aspect of the disclosure. Similar to FIG. 2B, the core network 140 includes the SGSN 220B and the GGSN 225B. However, in FIG. 2C, Direct Tunnel is an optional function in Iu mode that allows the SGSN 220B to establish a direct user plane tunnel, GTP-U, between the RAN 120 and the GGSN 225B within a PS domain. A Direct Tunnel capable SGSN, such as SGSN 220B in FIG. 2C, can be configured on a per GGSN and per RNC basis whether or not the SGSN 220B can use a direct user plane connection. The SGSN 220B in FIG. 2C handles the control plane signaling and makes the decision of when to establish Direct Tunnel When the RAB assigned for a PDP context is released (i.e. the PDP context is preserved) the GTP-U tunnel is established between the GGSN 225B and SGSN 220B in order to be able to handle the downlink packets.

Figure 2D:
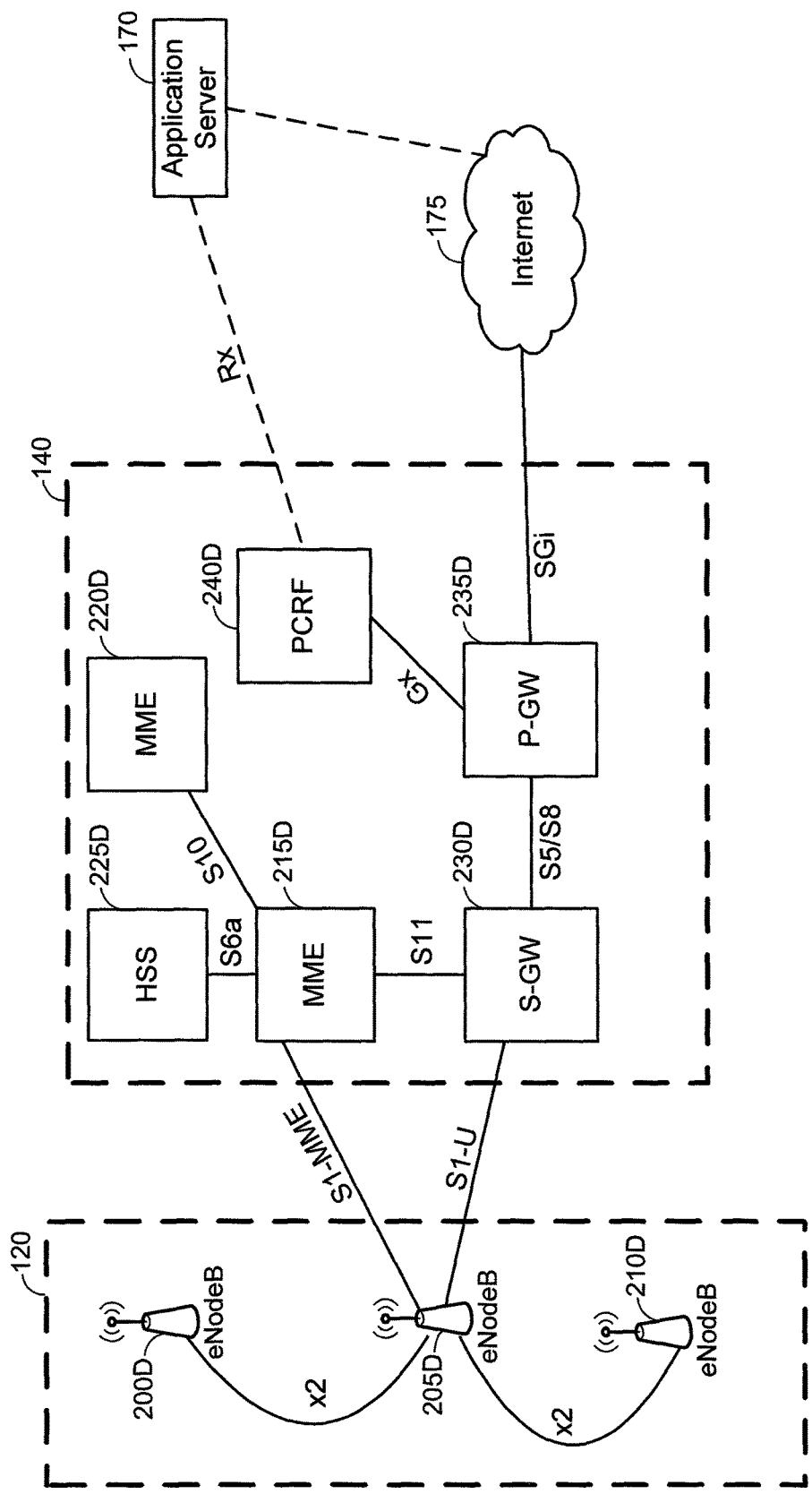
FIG. 2D illustrates an example configuration of the RAN and a packet-switched portion of the core network that is based on an Evolved Packet System (EPS) or Long Term Evolution (LTE) network according to one aspect of the disclosure.

FIG. 2D illustrates an example configuration of the RAN 120 and a packet-switched portion of the core network 140 based on an Evolved Packet System (EPS) or LTE network, according to one aspect of the disclosure. Referring to FIG. 2D, unlike the RAN 120 shown in FIGS. 2B-2C, the RAN 120 in the EPS/LTE network is configured with a plurality of eNodeBs 200D, 205D and 210D, without the RNC 215B from FIGS. 2B-2C. This is because eNodeBs in EPS/LTE networks do not require a separate controller (i.e., the RNC 215B) within the RAN 120 to communicate with the core network 140. In other words, some of the functionality of the RNC 215B from FIGS. 2B-2C is built into each respective eNodeB of the RAN 120 in FIG. 2D.

In FIG. 2D, the core network 140 includes a plurality of Mobility Management Entities (MMEs) 215D and 220D, a Home Subscriber Server (HSS) 225D, a Serving Gateway (S-GW) 230D, a Packet Data Network Gateway (P-GW) 235D and a Policy and Charging Rules Function (PCRF) 240D. Network interfaces between these components, the RAN 120 and the Internet 175 are illustrated in FIG. 2D and are defined in Table 1 (below) as follows:

TABLE 1

EPS/LTE Core Network Connection Definitions

| Network Interface | Description |
| --- | --- |
| S1-MME | Reference point for the control plane protocol between RAN 120 and MME 215D. |
| S1-U | Reference point between RAN 120 and S-GW 230D for the per bearer user plane tunneling and inter-eNodeB path switching during handover. |
| S5 | Provides user plane tunneling and tunnel management between S-GW 230D and P-GW 235D. It is used for S-GW relocation due to UE mobility and if the S-GW 230D needs to connect to a non-collocated P-GW for the required PDN connectivity. |
| S6a | Enables transfer of subscription and authentication data for authenticating/authorizing user access to the evolved system (Authentication, Authorization, and Accounting [AAA] interface) between MME 215D and HSS 225D. |
| Gx | Provides transfer of Quality of Service (QoS) policy and charging rules from PCRF 240D to Policy a Charging Enforcement Function (PCEF) component (not shown) in the P-GW 235D. |
| S8 | Inter-PLMN reference point providing user and control plane between the S-GW 230D in a Visited Public Land Mobile Network (VPLMN) and the P-GW 235D in a Home Public Land Mobile Network (HPLMN). S8 is the inter-PLMN variant of S5. |
| S10 | Reference point between MMEs 215D and 220D for MME relocation and MME to MME information transfer. |
| S11 | Reference point between MME 215D and S-GW 230D. |
| SGi | Reference point between the P-GW 235D and the packet data network, shown in FIG. 2D as the Internet 175. The Packet data network may be an operator external public or private packet data network or an intra-operator packet data network (e.g., for provision of IMS services). This reference point corresponds to Gi for 3GPP accesses. |

TABLE 1-continued

EPS/LTE Core Network Connection Definitions

| Network Interface | Description |
|---|---|
| X2 | Reference point between two different eNodeBs used for UE handoffs. |
| Rx | Reference point between the PCRF 240D and an application function (AF) that is used to exchanged application-level session information, where the AF is represented in FIG. 1 by the application server 170. |

A high-level description of the components shown in the RAN 120 and core network 140 of FIG. 2D will now be described. However, these components are each well-known in the art from various 3GPP TS standards, and the description contained herein is not intended to be an exhaustive description of all functionalities performed by these components.

Referring to FIG. 2D, the MMEs 215D and 220D are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2D, the S-GW 230D is the gateway that terminates the interface toward the RAN 120. For each UE associated with the core network 140 for an EPS-based system, at a given point of time, there is a single S-GW. The functions of the S-GW 230D, for both the GTP-based and the Proxy Mobile IPv6 (PMIP)-based S5/S8, include: Mobility anchor point, Packet routing and forwarding, and setting the DiffServ Code Point (DSCP) based on a QoS Class Identifier (QCI) of the associated EPS bearer.

Referring to FIG. 2D, the P-GW 235D is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235D provides PDN connectivity to both GSM/EDGE Radio Access Network (GERAN)/UTRAN only UEs and E-UTRAN-capable UEs using any of E-UTRAN, GERAN, or UTRAN. The P-GW 235D provides PDN connectivity to E-UTRAN capable UEs using E-UTRAN only over the S5/S8 interface.

Referring to FIG. 2D, the PCRF 240D is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2D, the application server 170 (e.g., which can be referred to as the AF in 3GPP terminology) is shown as connected to the core network 140 via the Internet 175, or alternatively to the PCRF 240D directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network sub system. The AF uses the Rx reference point to provide session information to the PCRF 240D. Any other application server offering IP data services over cellular network can also be connected to the PCRF 240D via the Rx reference point.

Figure 2E:
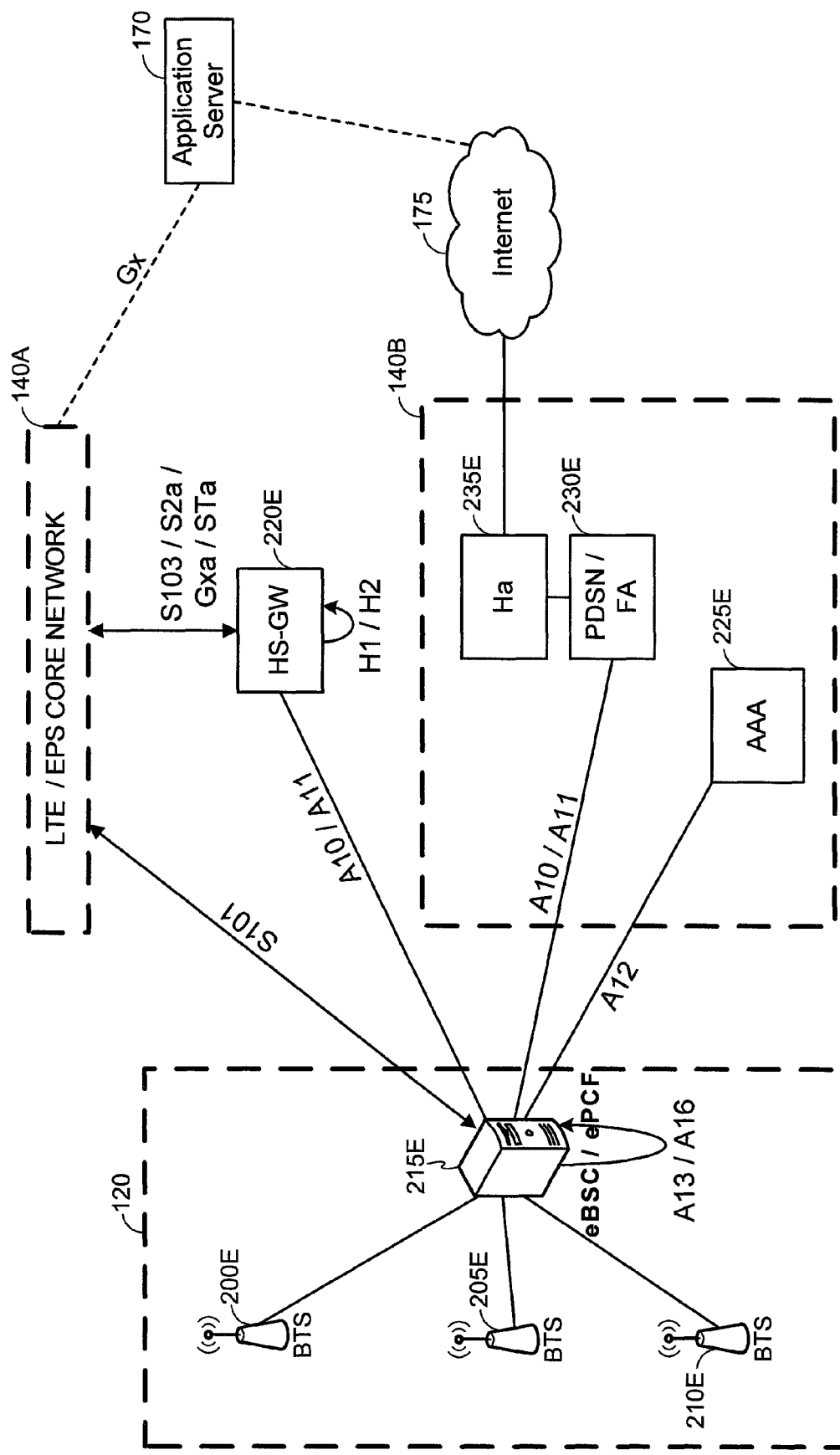
FIG. 2E illustrates an example configuration of an enhanced High Rate Packet Data (HRPD) RAN connected to an EPS or LTE network and also a packet-switched portion of an HRPD core network according to one aspect of the disclosure.

FIG. 2E illustrates an example of the RAN 120 configured as an enhanced High Rate Packet Data (HRPD) RAN connected to an EPS or LTE network 140A and also a packet-switched portion of an HRPD core network 140B according to one aspect of the disclosure. The core network 140A is an EPS or LTE core network, similar to the core network described above with respect to FIG. 2D.

In FIG. 2E, the eHRPD RAN includes a plurality of base transceiver stations (BTSs) 200E, 205E and 210E, which are connected to an enhanced BSC (eBSC) and enhanced PCF (ePCF) 215E. The eBSC/ePCF 215E can connect to one of the MMEs 215D or 220D within the EPS core network 140A over an S101 interface, and to an HRPD serving gateway (HSGW) 220E over A10 and/or A11 interfaces for interfacing with other entities in the EPS core network 140A (e.g., the S-GW 220D over an S103 interface, the P-GW 235D over an S2a interface, the PCRF 240D over a Gxa interface, a 3GPP AAA server (not shown explicitly in FIG. 2D) over an STa interface, etc.). The HSGW 220E is defined in 3GPP2 to provide the interworking between HRPD networks and EPS/LTE networks. As will be appreciated, the eHRPD RAN and the HSGW 220E are configured with interface functionality to EPC/LTE networks that is not available in legacy HRPD networks.

Turning back to the eHRPD RAN, in addition to interfacing with the EPS/LTE network 140A, the eHRPD RAN can also interface with legacy HRPD networks such as HRPD network 140B. As will be appreciated the HRPD network 140B is an example implementation of a legacy HRPD network, such as the EV-DO network from FIG. 2A. For example, the eBSC/ePCF 215E can interface with an authentication, authorization and accounting (AAA) server 225E via an A12 interface, or to a PDSN/FA 230E via an A10 or A11 interface. The PDSN/FA 230E in turn connects to HA 235E, through which the Internet 175 can be accessed. In FIG. 2E, certain interfaces (e.g., A13, A16, H1, H2, etc.) are not described explicitly but are shown for completeness and would be understood by one of ordinary skill in the art familiar with HRPD or eHRPD.

Referring to FIGS. 2B-2E, it will be appreciated that LTE core networks (e.g., FIG. 2D) and HRPD core networks that interface with eHRPD RANs and HSGWs (e.g., FIG. 2E) can support network-initiated Quality of Service (QoS) (e.g., by the P-GW, GGSN, SGSN, etc.) in certain cases.

Figure 3:
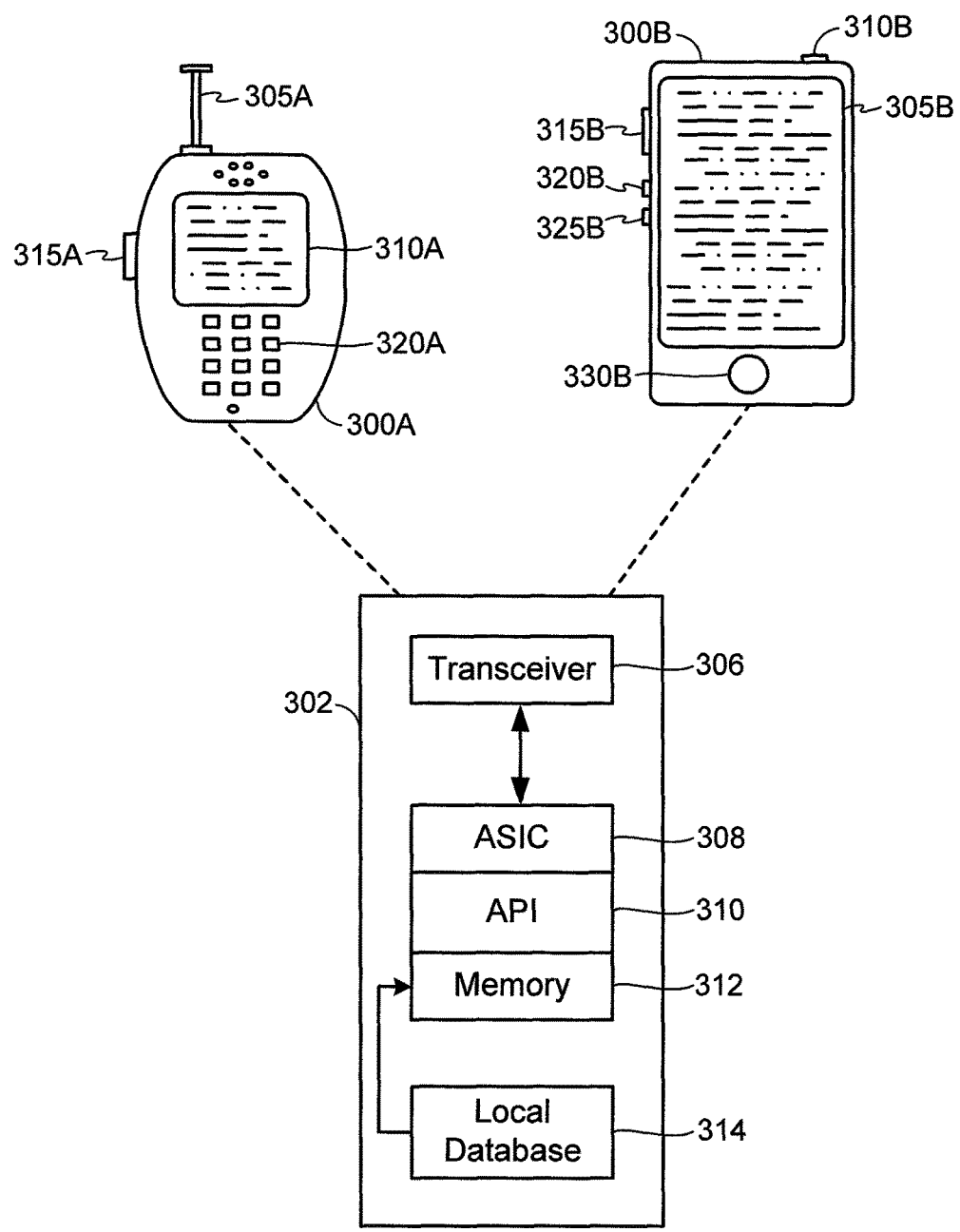
FIG. 3 illustrates examples of user equipments (UEs) according to one aspect of the disclosure.

FIG. 3 illustrates examples of UEs according to one aspect of the disclosure. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to Wi-Fi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, one embodiment disclosed herein can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the disclosure is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments disclosed herein and are merely to aid in describing aspects of the embodiments disclosed herein.

Figure 4:
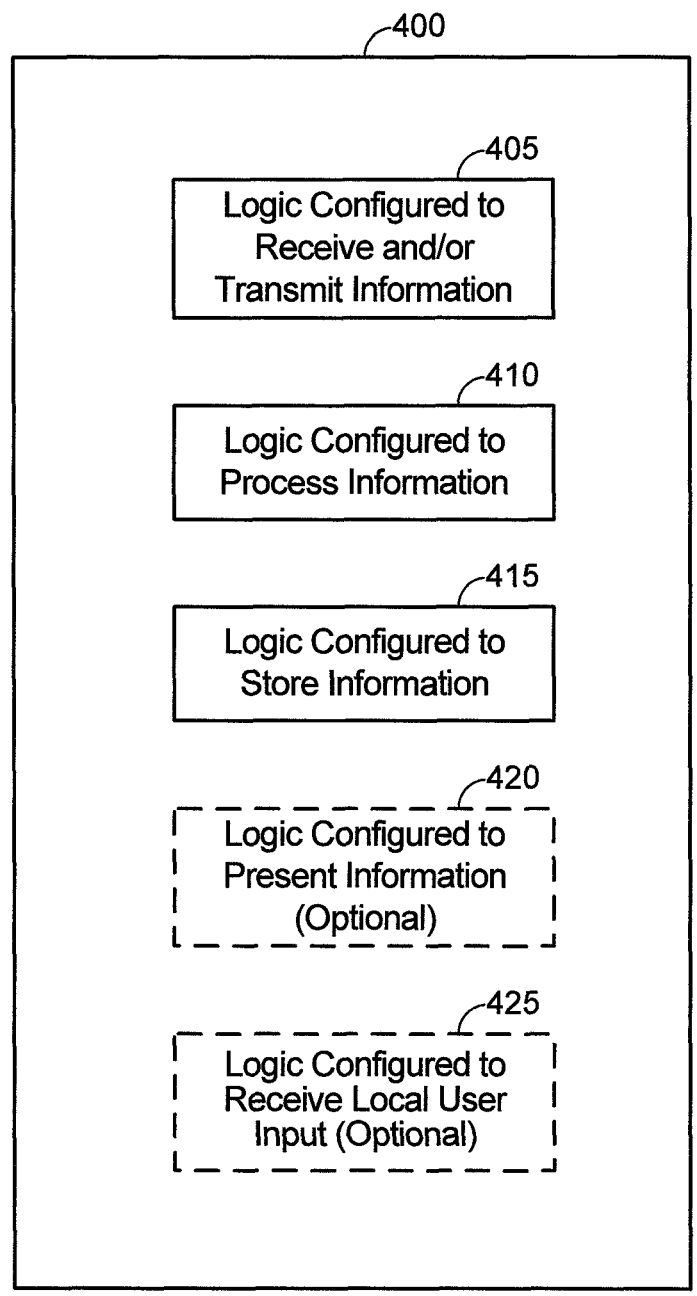
FIG. 4 illustrates a communication device that includes logic configured to perform functionality according to one aspect of the disclosure.

FIG. 4 illustrates a communication device 400 that includes logic configured to perform functionality. The communication device 400 can correspond to any of the above-noted communication devices, including but not limited to UEs 300A or 300B, any component of the RAN 120 (e.g., BSs 200A through 210A, BSC 215A, Node Bs 200B through 210B, RNC 215B, eNodeBs 200D through 210D, etc.), any component of the core network 140 (e.g., PCF 220A, PDSN 225A, SGSN 220B, GGSN 225B, MME 215D or 220D, HSS 225D, S-GW 230D, P-GW 235D, PCRF 240D), any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 1.

Referring to FIG. 4, the communication device 400 includes logic configured to receive and/or transmit information 405. In an example, if the communication device 400 corresponds to a wireless communications device (e.g., UE 300A or 300B, one of BSs 200A through 210A, one of Node Bs 200B through 210B, one of eNodeBs 200D through 210D, etc.), the logic configured to receive and/or transmit information 405 can include a wireless communications interface (e.g., Bluetooth, Wi-Fi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., PDSN, SGSN, GGSN, S-GW, P-GW, MME, HSS, PCRF, the application 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 3, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 3, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 5:
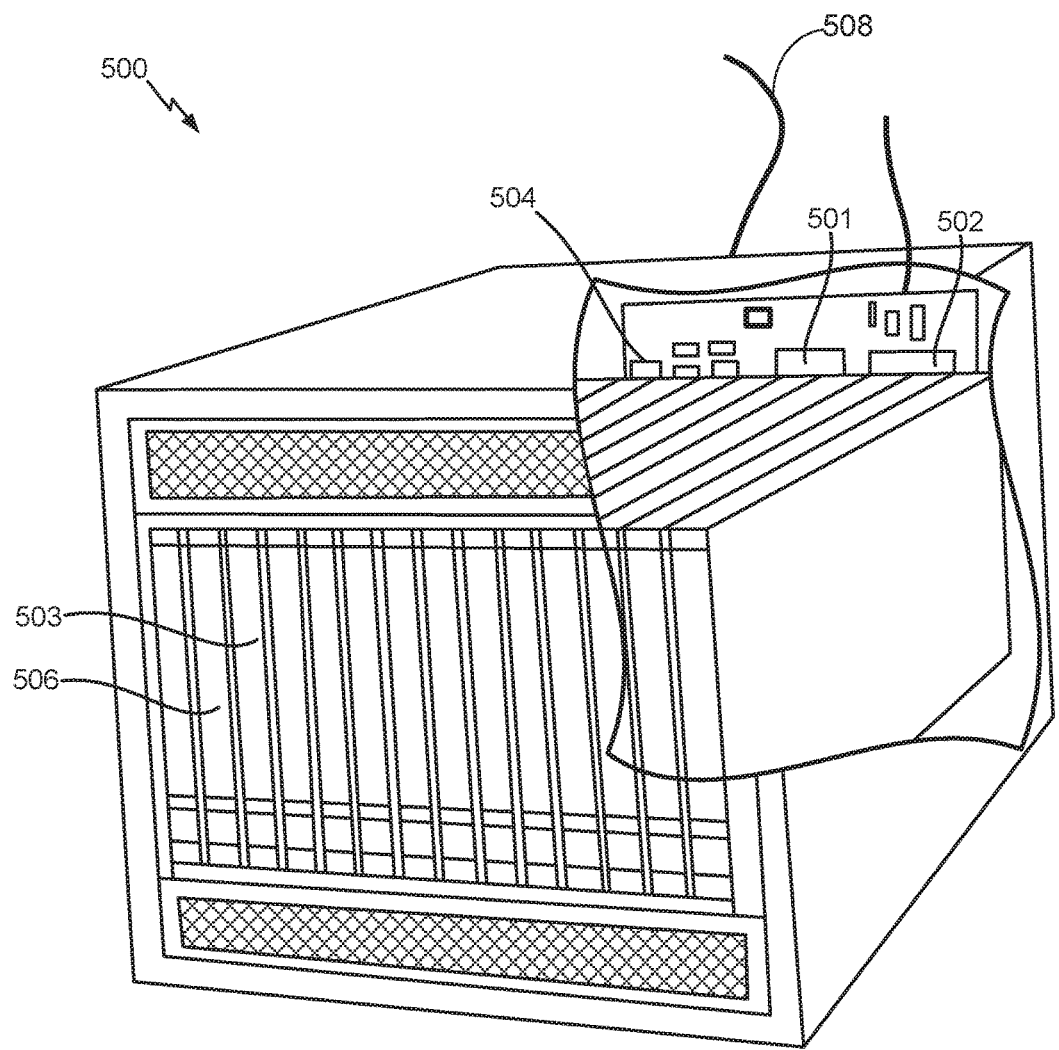
FIG. 5 illustrates an exemplary server according to one aspect of the disclosure.

The various embodiments may be implemented on any of a variety of commercially available server devices, such as server 500 illustrated in FIG. 5. In an example, the server 500 may correspond to one example configuration of the application server 170 described above. In FIG. 5, the server 500 includes a processor 501 coupled to volatile memory 502 and a large capacity nonvolatile memory, such as a disk drive 503. The server 500 may also include a floppy disc drive, compact disc (CD) or DVD disc drive 506 coupled to the processor 501. The server 500 may also include network access ports 504 coupled to the processor 501 for establishing data connections with a network 507, such as a local area network coupled to other broadcast system computers and servers or to the Internet. In context with FIG. 4, it will be appreciated that the server 500 of FIG. 5 illustrates one example implementation of the communication device 400, whereby the logic configured to transmit and/or receive information 405 corresponds to the network access points 504 used by the server 500 to communicate with the network 507, the logic configured to process information 410 corresponds to the processor 501, and the logic configuration to store information 415 corresponds to any combination of the volatile memory 502, the disk drive 503 and/or the disc drive 506. The optional logic configured to present information 420 and the optional logic configured to receive local user input 425 are not shown explicitly in FIG. 5 and may or may not be included therein. Thus, FIG. 5 helps to demonstrate that the communication device 400 may be implemented as a server, in addition to a UE implementation as in the UE 300A or the UE 300B as in FIG. 3.

Sessions that operate over networks such as 1xEV-DO in FIG. 2A, UMTS-based W-CDMA in FIGS. 2B-2C, LTE in FIG. 2D and eHRPD in FIG. 2E can be supported on channels (e.g. RABs, flows, etc.) for which a guaranteed quality level is reserved, which is referred to as Quality of Service (QoS). For example, establishing a given level of QoS on a particular channel may provide one or more of a minimum guaranteed bit rate (GBR) on that channel, a maximum delay, jitter, latency, bit error rate (BER), and so on. QoS resources can be reserved (or set up) for channels associated with real-time or streaming communication sessions, such as Voice-over IP (VoIP) sessions, group communication sessions (e.g., PTT sessions, etc.), online games, IP TV, and so on, to help ensure seamless end-to-end packet transfer for these sessions. In certain cases, scheduled always-on (GBR) service for high-priority applications running on a UE or other suitable mobile device may be desirable to improve capacity (e.g., on the UE and/or the network that provides the always-on service) and further to improve resource network usage. For example, real-time communication often requires always-on service to ensure bi-directional IP communication. However, some non-real-time or periodic services may not require always-on service. For example, always-on service may not be required during off-duty hours, whereby providing the entire work force with always-on service may degrade capacity, network resource usage, or other QoS requirements because network resources would be reserved to applications during times when such resources are not being used. Further, always-on service may not be ideal for capacity on the UE. For example, if always-on or GBR service is provided on-demand only to improve capacity or resource constraints associated with one or more applications on the UE that do not necessarily require GBR, data terminating on the UE (e.g., data sent to the UE from an external device) may suffer due to the always-on service.

Figure 9:
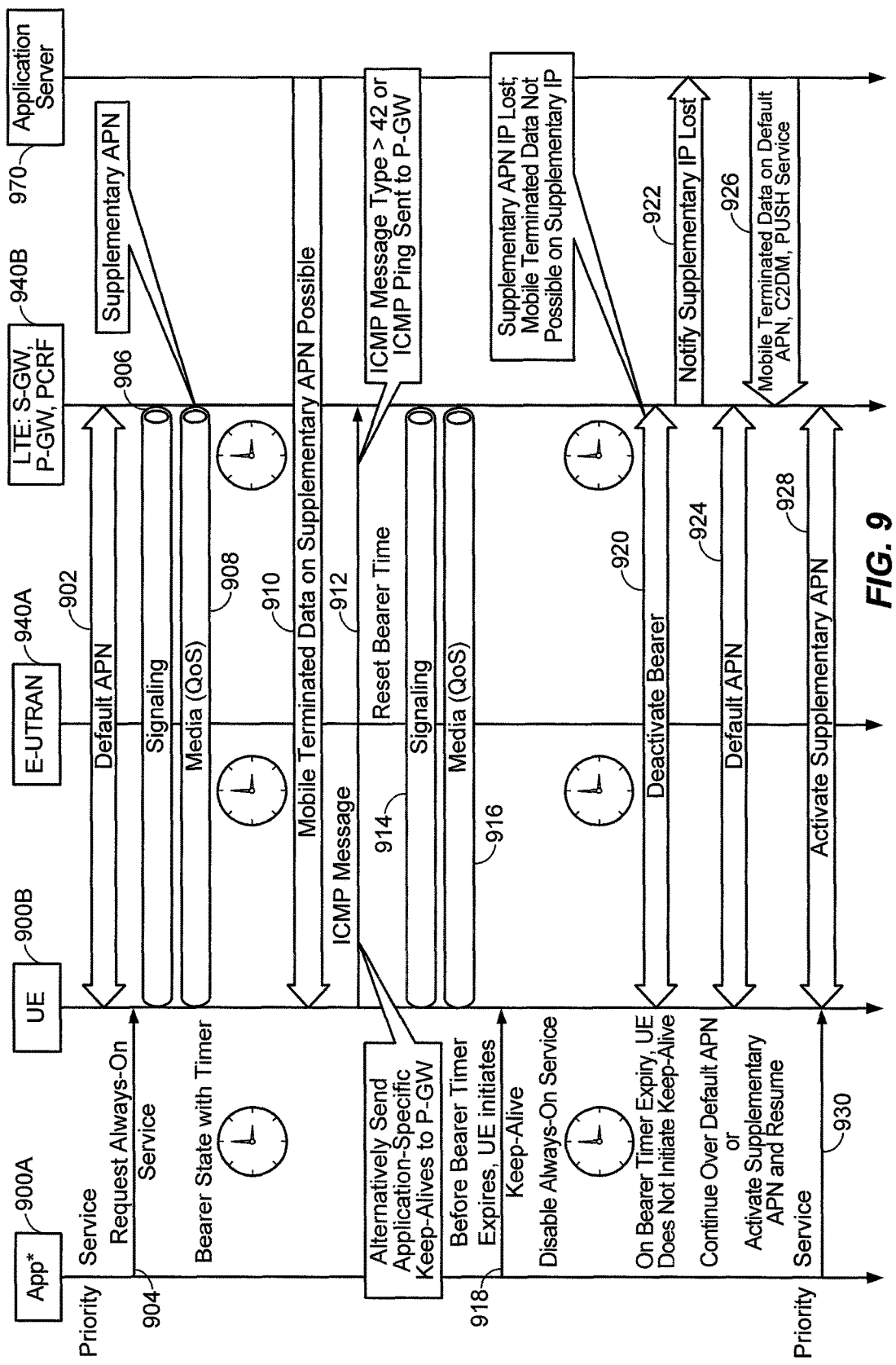
FIG. 9 illustrates an exemplary communication flow to optimize always-on service for one or more applications using network assistance and keep-alives according to one aspect of the disclosure.

In general, always-on service is often achieved via application-layer keep-alives, which tend to have various drawbacks and disadvantages. For example, application-layer keep-alives generally require an application-layer server to provide and maintain the always-on service and a keep-alive for each application that requires always-on service, which can waste or degrade network capacity and handset battery life. Accordingly, the following description provides a solution that can provide always-on service only during the period leading to when the high-priority application needs the always-on service may desired to limit always-on service to time periods when it may be needed. For example, in one embodiment, the network providing the always-on service may maintain a dedicated bearer for a fixed time period and provide the UE with an availability time for the dedicated bearer in addition to an IP address for the Packet Data Network Gateway (P-GW), application server, or other suitable network component that provides a termination point toward a packet data network (PDN). In one embodiment, the UE may maintain the state of the bearer availability time and send a keep-alive message that resets the bearer state to the core packet network if any applications running thereon request a dedicated bearer for the always-on service. The UE may provide an interface where all applications that are interested in the always-on service and use a particular APN can register to utilize the always-on service. The UE can thereby opportunistically schedule single keep-alives for the bearers associated with all of the applications that have registered interested in the always-on service and use the particular APN. Furthermore, the UE may similarly send one keep-alive message within the bearer availability period for all applications on the UE that request or otherwise require a bearer dedicated to always-on service. Alternatively, in one embodiment, when the UE transitions to an RRC connected state for activity on EPS bearers associated with other APNs and the bearer availability period is near expiration or otherwise at or above a certain predetermined threshold, the UE can opportunistically schedule the keep-alive message to reset the bearer inactivity. This opportunistic scheduling of keep-alives may reduce network signaling and frequent establishing of over-the-air resources (e.g., as shown in FIG. 9 and described in further detail below).

According to one embodiment, FIG. 6 illustrates an exemplary ICMP message 600 that may be used for the keep-alive message that the UE sends to the core packet network to reset the bearer state for all applications that request or otherwise require the bearer for always-on service. In one embodiment, the ICMP message 600 shown in FIG. 6 may include a twenty (20) byte IP header 610 and an ICMP payload 640 that includes eight (8) or more bytes. More particularly, the IP header 610 may include a one-byte version or Internet Header Length (IHL) field 612, a one-byte service type field 614, a two-byte length field 616, a two-byte identification field 618, a two-byte flags and offset field 602, a one-byte Time-To-Live (TTL) field 622, a one-byte protocol field 624, a two-byte checksum 626, a four-byte source IP address field 628, and a four-byte destination address field 630. Furthermore, the ICMP payload 640 may include a one-byte message type field 642 having a value greater than forty-two (i.e., reserved fields in the ICMP standard), a one-byte code 646, a two-byte checksum 648, and a four-byte quench field 650. In addition, the ICMP payload may optionally include one or more data bytes 660.

In one embodiment, the information encoded in the IP header 610 and ICMP payload 640 associated with the ICMP message 600 that the UE sends to the core packet network may generally instruct the appropriate component that receives the ICMP message 600 on the core packet network to reset the bearer availability time without generating a reply message to the UE. As such, the ICMP message 600 may reduce network overhead because the network may not need to send keep-alive traffic to the UE. Furthermore, when a certain application that requested always-on service no longer requires the always-on service (e.g., when the user is off the service, has an 'away' presence status, etc.), the application may send a message notifying the UE to disable keep-alives associated therewith. Accordingly, if all applications that had been receiving always-on service notify the UE to disable keep-alives (or no applications running on the UE otherwise require always-on service), the UE may stop sending the keep-alive messages to the network, whereby the network may deactivate the bearer(s) dedicated to the UE if no keep-alive messages are received before the bearer(s) availability time expires. In one embodiment, if the network subsequently determines that the UE has to be reached for a non-priority call or other non-priority data terminating thereon, the network may use a push notification or a dedicated bearer associated with a default Access Point Name (APN) to terminate the call or other data on the UE. Furthermore, when one or more applications on the UE return to a high-priority state that requires always-on service, the UE may initiate a request to activate the dedicated bearer and maintain the state associated with the bearer dedicated to always-on service in a similar manner to that described above (e.g., sending one keep-alive message prior to the bearer availability time expiring to reset the availability time for all applications running on the UE that require always-on service). Accordingly, the ICMP message 600 may provide a unified mechanism to achieve scheduled always-on service, wherein the ICMP message 600 may have a low overhead because no echo replies are required while reducing battery consumption and improving network capacity because the UE only has to send one keep-alive message within the bearer availability period for all applications on the UE that require always-on service. Alternatively, in one embodiment, the UE may send a conventional ICMP packet, a conventional IP packet, or another suitable message to the core network to reset the data inactivity timers.

Figure 7:
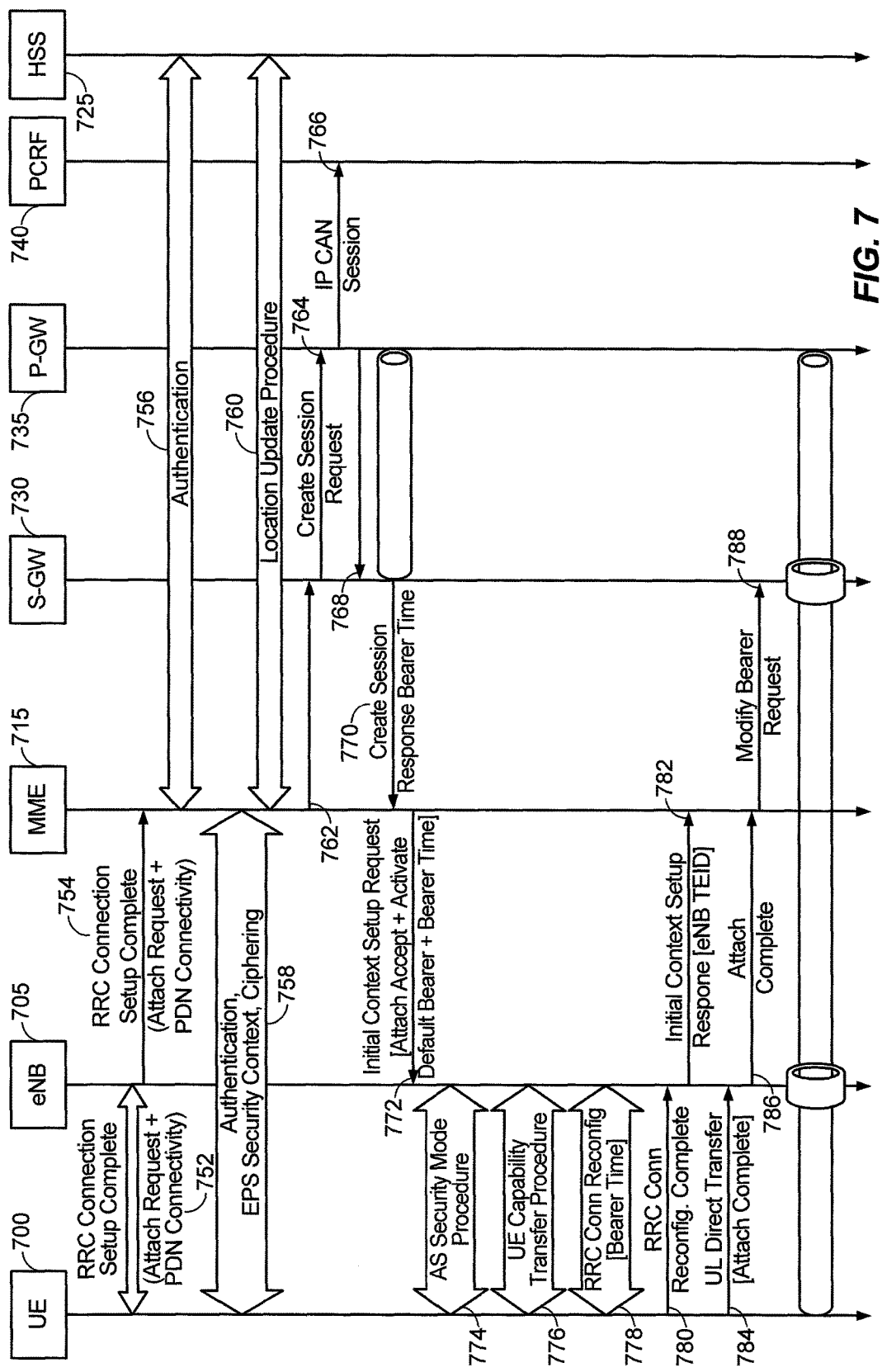
FIG. 7 illustrates an exemplary communication flow to deliver a bearer time to a UE in an EPS or LTE network according to one aspect of the disclosure.

According to one embodiment, FIG. 7 illustrates an exemplary communication flow to deliver a bearer time to a UE 700 in an EPS or LTE network, which may have the same or a substantially configuration to the RAN 120 and packet-switched core network 140 based on an EPS or LTE network, as shown in FIG. 2D and described in further detail above. In one embodiment, the UE 700 may use the delivered bearer time to set up a GBR EPS bearer that may be used to optimize always-on wireless service for any suitable high-priority GBR application, referred to hereinafter as App*. In general, App* can correspond to any suitable application that requires GBR QoS and always-on service on an associated EPS media bearer to support its communication sessions (e.g., PTT sessions, VoIP sessions, etc.) and uses a dedicated Access Point Name (APN) or other suitable context configured to specifically identify App* to external devices or other components of the EPS or LTE network, such as eNB 705, MME 715, S-GW 730, P-GW 735, PCRF 740, and/or HSS 725. However, it will be apparent that the above-mentioned components of the EPS or LTE network that may use the dedicated context to identify App* are exemplary only, in that the communication flow may suitably involve communication among fewer, more, or different components of the EPS or LTE network to deliver the bearer time to the UE 700.

In one embodiment, the communication flow shown in FIG. 7 may generally correspond to an LTE attach and PDN connectivity procedure that the UE 700 may initiate to make its presence known to the packet-switched core network. More particularly, at 752, the LTE attach and PDN connectivity procedure shown in FIG. 7 may initially include the UE 700 establishing an RRC connection before sending an attach request. The UE 700 may send a network attachment NAS message and a request for an EPS bearer to the eNB 705 in order to request service with the EPC network. In one embodiment, the information elements regarding the network attachment and the EPS bearer set up may include, among other things, an EPS Attach Type set to Initial Attach, an NAS: PDN connectivity request message (which may be included in an ESM message), a PDN Type set to IPv4, and certain NAS security-related items. At 754, the eNB 705 selects an MME (e.g., MME 715) for the UE 700 in response to receiving the attach request message from the UE 700 and forwards the NAS message received from the UE 700 to the MME 715 over the S1-MME interface. At 756, the MME 715 may then query the HSS 725 over the Sha interface to obtain information that may be used to authenticate the UE 700 prior to processing the attach request, wherein the HSS 725 generates and sends Authentication and Key Agreement (AKA), Authentication Vector (AV), and Key Access Security Management Entity (KASME) information to the MME 715 in response to the query from the MME 715.

In one embodiment, at 758, the MME 715 may process and send authentication, EPS security context, and ciphering options to the UE 700 based on the information sent from the HSS 725 and the MME 715 further completes a location update procedure with the HSS 725 at 760 in response to successfully completing the authentication and security procedures. Upon completing the location update procedure, the MME 715 selects an S-GW (e.g., S-GW 730) for PDN connectivity and uses the APN associated with the UE 700 (or a default APN) to select a P-GW (e.g., P-GW 735 for providing connectivity to the PDN. At 762, the MME 715 then sends a Create Session request to the selected S-GW 730, which sends a Create Session request to the selected P-GW 735 at 764 to initiate creating an IP session. Furthermore, the selected S-GW 730 may initiate the GPRS Tunneling Protocol (GTP) tunnels for control plane and user plane traffic. In one embodiment, in response to receiving the Create Session request from the S-GW 730, the P-GW 735 performs an IP-CAN session establishment procedure at 766, assigns an IPv4 address to the UE 700, and sends a Create Session response to the S-GW 730 at 768 to complete the creation of the S5 GTP tunnel (or bearer) between the S-GW 730 and the P-GW 735 for traffic from the given UE 700. Furthermore, in one embodiment, the P-GW 735 may further send the S-GW 730 a time period during which the S5 GTP tunnel (or bearer) for the traffic from the UE 700 will be held in an active state and an IP address of the P-GW 735 in the Protocol Configuration Option (PCO) information element in the bearer activation message. In response thereto, the S-GW 730 sends a Create Session response to the MME 715 at 770 to complete the S5 GTP tunnel between the S-GW 730 and the MME 715 for control plane signaling associated with the UE 700. Furthermore, the S-GW 730 sends the MME 715 information to create a user plane GTP tunnel between the MME 715 and the eNB 705 in addition to information received from the P-GW 735, including the time period during which the GTP tunnel will be held in the active state and the IP address of the P-GW 735.

In one embodiment, at 772, the MME 715 then uses the information received from the P-GW 735 (via the S-GW 730) and sends an Initial Context Setup request message to the eNB 705, wherein the Initial Context Setup request message sent from the MME 715 to the eNB 705 may encapsulate an Attach accept message, an Activate Default EPS Bearer Context Request (which may include the APN, PDN address, QoS, or other information associated with the bearer), the EPS bearer identity and the bearer availability time, and a Tunnel Endpoint Identifier (TEID) of the S-GW 730. In one embodiment, the eNB 705 may then configure the access-stratum (AS) security context with the UE 700 at 774, trigger a UE capability transfer procedure at 776 prior to establishing the Data Radio Bearer (DRB) corresponding to the default bearer, and send an RRC Connection Reconfiguration message including the EPS radio bearer identity and bearer availability time to the UE 700 together with the Attach Accept message at 778. At 780, the UE 700 may then send an RRC Connection Reconfiguration Complete message to the eNB 705 to acknowledge the RRC Connection Reconfiguration message. At 782, in response to receiving the RRC Connection Reconfiguration Complete message, the eNB 705 may send the Initial Context Setup Response message to the MME 715 together with the TEID of the eNB 705B and information to complete the establishment of the user plane GTP tunnel between the eNB 705 and S-GW 730.

In one embodiment, at 784, the UE 700 may further acknowledge the Attach Accept message and send an Uplink (UL) Direct Transfer message to the eNB 705, wherein the UL Direct Transfer message may include the Attach Complete message with the EPS bearer Identity, NAS sequence number, and NAS-MAC. In addition, the Attach Complete message may further include an ESM message container information element, which may have ACTIVATE DEFAULT EPS BEARER CONTEXT ACCEPT encapsulated therein. In one embodiment, at 786, the eNB 705 may then forward the Attach Complete message to the MME 715 (e.g., in a UL NAS Transport message or other suitable message), and at 788, the MME 715 sends a Modify Bearer Request message (including the EPS bearer identity, address and TEID of the eNB 705, and a Handover Indication) to the S-GW 730 in response to receiving both the Initial Context Response message and the Attach Complete message from the eNB 705. In particular, the Modify Bearer Request message sent to the S-GW 730 may create a downlink (DL) GTP tunnel and thereby establish the EPS bearer to provide always-on service to App*. For example, in one embodiment, the established EPS bearer may generally comprise the DRB between the UE 700 and the eNB 705, the S1-U bearer between the eNB 705 and the S-GW 730, and the S5 bearer between the S-GW 730 and the P-GW 735. The UE 700 may then use the bearer availability time and ICMP keep-alive messages in accordance with the mechanisms described above to manage always-on service for App* (e.g., as illustrated in FIG. 9, which illustrates an exemplary communication flow to optimize always-on wireless service for App* using network assistance and keep-alives in accordance with the ICMP message 600 shown in FIG. 6 and the mechanisms associated therewith that are described in greater detail above).

Figure 8:
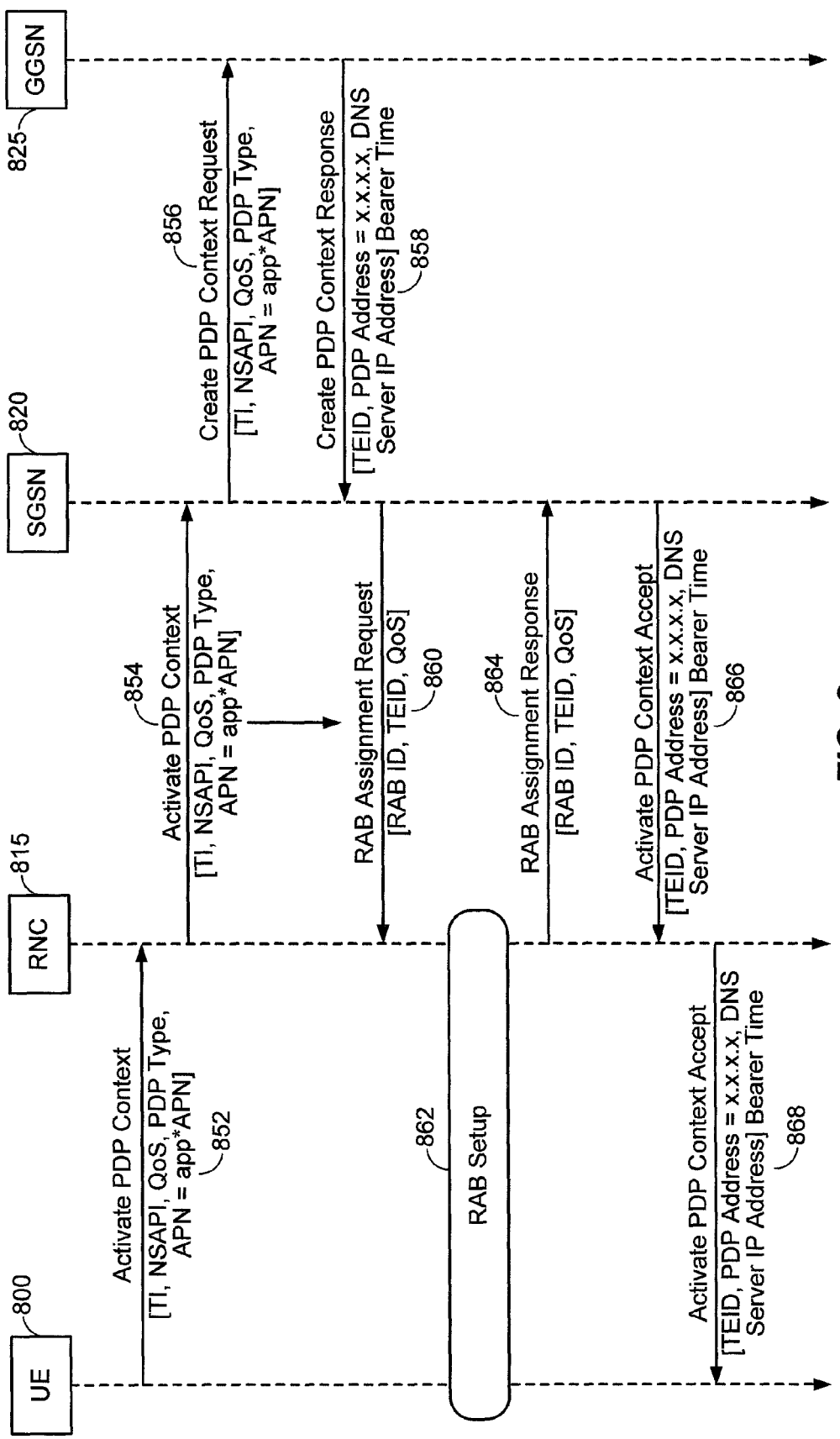
FIG. 8 illustrates an exemplary communication flow to deliver a bearer time to a UE in a UMTS-based W-CDMA network according to one aspect of the disclosure.

According to one embodiment, FIG. 8 illustrates an exemplary communication flow to deliver a bearer time to a UE 800 in a UMTS-based W-CDMA network, which may have the same or a substantially configuration to the RAN 120 and packet-switched GPRS core network 140 within a 3G UMTS-based W-CDMA system, as shown in FIG. 2B and described in further detail above. In one embodiment, the UE 800 may use the delivered bearer time to set up the GBR EPS bearer to optimize always-on wireless service for App*, which may generally require GBR QoS on an associated EPS media bearer to support its communication sessions (e.g., PTT sessions, VoIP sessions, etc.) and use a dedicated Packet Data Protocol (PDP) context or other suitable context that may specifically identify App* to external devices or other components of the UMTS-based W-CDMA network, such as RNC 815, SGSN 820, and/or GGSN 825. However, it will be apparent that the above-mentioned components of the UMTS-based W-CDMA network that may use the dedicated context to identify App* are exemplary only, in that the communication flow may suitably involve communication among fewer, more, or different components of the UMTS-based W-CDMA network to deliver the bearer time to the UE 800.

In one embodiment, the communication flow shown in FIG. 8 may generally correspond to an Activate PDP context procedure that the UE 800 may initiate to make its presence known to the packet-switched core network. More particularly, at 852, the Activate PDP context procedure shown in FIG. 8 may initially include the UE 800 sending an Activate PDP Context message to an Radio Network Controller (e.g., RNC 815), wherein parameters of the Activate PDP Context message may include a Transaction Identifier (TI) of the NAS signaling connection for the PDP context, a Network Layer Service Access Point Identifier (NSAPI) used to identify a user plane connection for the PDP context, QoS requirements (e.g., a guaranteed uplink or downlink bit rate, a maximum uplink or downlink bit rate, etc.), a PDP type (e.g., IPv4 or IPv6, etc.), and a dedicated Access Point Name (APN) associated with the application(s) on the UE 800 that require always-on service (e.g., "app*APN"). At 854, in response to the RNC 815 receiving the Activate PDP Context message from the UE 800, the RNC 815 forwards the Activate PDP Context message and the associated parameters received from the UE 800 to a Serving General Packet Radio Service (GPRS) Support Node (e.g., SGSN 820), which generates a Create PDP Context Request message based on the received Activate PDP Context message. At 856, the SGSN 820 may send the Create PDP Context Request message to a Gateway GPRS Support Node (e.g., GGSN 825), wherein the Create PDP Context Request message sent to the GGSN 825 may have the same or substantially similar parameters to the Activate PDP Context message sent from the RNC 815.

In one embodiment, at 858, the GGSN 825 then processes the Create PDP Context Request message and sends a Create PDP Context Response message to the SGSN 820, wherein the Create PDP Context Response message may include the TEID of the GGSN 825, the PDP address of the GGSN 825 (e.g., "x.x.x.x"), a Domain Name System (DNS) server IP address, and a bearer availability time. In response to receiving the Create PDP Context Response message from the GGSN 825, the SGSN 820 may generate a Radio Access Bearer (RAB) Assignment Request message based on the information in the Create PDP Context Response message sent from the GGSN 825. For example, in one embodiment, the RAB Assignment Request message may include an identifier (ID) associated with the RAB, the TEID of the GGSN 825 and/or the SGSN 820, and the QoS reserved to the RAB. At 860, the SGSN 820 may send the RAB Assignment Request message to the RNC 815. At 862, the RNC 815 may then communicate with the UE 800 using the information associated with the RAB Assignment Request message to set up the RAB between the UE 800 and the RNC 815. In response to the RAB setup between the UE 800 and the RNC 815 successfully completing, the RNC 815 may send an RAB Assignment Response message to the SGSN 820 at 864, wherein the RAB Assignment Response message may acknowledge the RAB ID, TEID, and QoS specified in the Assignment Request message previously received from the SGSN 820.

At 866, in response to receiving the RAB Assignment Response message from the RNC 815, the SGSN 820 may send an Activate PDP Context Accept message to the RNC 815, wherein the Activate PDP Context Accept message may specify the TEID of the GGSN 825 and/or the SGSN 820, the PDP address of the SGSN 820 (e.g., "x.x.x.x"), the DNS server IP address, and the time period during which the bearer for always-on traffic from the UE 800 will be held in an active state. At 868, the RNC 815 may forward the Activate PDP Context Accept message and the associated parameters to the UE 800, which may then use the bearer availability time and ICMP keep-alive messages in accordance with the mechanisms described above to manage always-on service for App* (e.g., as illustrated in the communication flow shown in FIG. 9, which may be used to optimize always-on wireless service for App* using network assistance and keep-alives in accordance with the ICMP message 600 shown in FIG. 6 and the mechanisms associated therewith that are described in greater detail above).

According to one aspect of the disclosure, FIG. 9 illustrates an exemplary communication flow to optimize always-on service for one or more applications using network assistance and keep-alives. In particular, at 902, a UE 900B may initially attach to an LTE (or EPS) core network 940B and use a default Access Point Name (APN) to communicate with the LTE core network 940B. For example, the default APN may generally include a network identifier that defines a Packet Data Network (PDN) to which the UE 900B has requested connectivity and an operator identifier that defines a Public Land Mobile Network (PLMN) where a Gateway GPRS Support Node (GGSN) or PDN Gateway (P-GW) that provides a point of interconnection with the defined PDN is located. At 904, one or more applications running on the UE 900B, referred to hereinafter as App* 900A, may require high-priority service at some point in time and therefore request always-on service from the UE 900B. At 906, the UE 900B may exchange various signaling messages with the LTE core network 940B and an E-UTRAN core network 940A to establish a bearer dedicated to the UE 900B for always-on service. As such, the signaling messages exchanged at 906 may generally establish the bearer dedicated to the always-on service and provide the UE 900B with state information associated with the bearer for the always-on service (e.g., a supplementary APN) and a time period during which the bearer for the always-on service will be held in an active state. For example, in one embodiment, the signaling messages that the UE 900B exchanges with the LTE core network 940B may be substantially similar to the signaling messages shown in FIG. 7 and described in further detail above, and the signaling messages that the UE 900B exchanges with the E-UTRAN core network 940A may likewise be substantially similar to the signaling messages shown in FIG. 8 and described in further detail above.

In one embodiment, at 908, the UE 900B may then communicate media or other data to and from App* 900A over the bearer dedicated to the UE 900B for always-on service using the supplementary APN and according to the required QoS for the high-priority service associated with App* 900A. Moreover, at 910, data that terminates at the UE 900B may be sent from an application server 970 to the UE 900B over the supplementary APN that corresponds to the bearer dedicated to the UE 900B for always-on service. Furthermore, in response to learning the time period during which the bearer for the always-on service will be held in an active state (e.g., based on the signaling messages exchanged at 906), the UE 900B may start a timer to maintain a state associated with the bearer availability for the always-on service. In one embodiment, at 912, the UE 900B may transmit a keep-alive message to the LTE core network 940B and/or the E-UTRAN core network 940A before the timer expires in order to reset the bearer state for each application App* 900A that has registered to use the supplementary APN for always-on service. For example, in one embodiment, the keep-alive message may have a structure corresponding to the ICMP message 600 shown in FIG. 6 and described in further detail above or the keep-alive message may alternatively comprise an ICMP ping message sent to the P-GW located on the LTE core network 940B. Alternatively, the UE 900B may transmit keep-alives specific to each App* 900A that has registered to use the supplementary APN for always-on service. Furthermore, if the UE 900B transitions to an RRC connected state for activity on EPS bearers other than the supplementary APN and the timer corresponding to the bearer availability period is near expiration or otherwise at or above a certain predetermined threshold, the UE can opportunistically schedule the keep-alive message at 912 to reset the bearer inactivity, wherein the opportunistic keep-alive scheduling may reduce network signaling and frequent establishing of over-the-air resources.

In any case, the keep-alive message(s) transmitted at 912 may cause the LTE core network 940B and the E-UTRAN core network 940A to reset the time period during which the bearer will be held in the active state and thereby maintain the bearer in an always-on state. At 914 and 916, the UE 900B may then exchange various signaling messages with the LTE core network 940B and an E-UTRAN core network 940A and communicate media or other data to and from App* 900A according to the required QoS using the supplementary APN in a substantially similar manner to that described above with respect to 906 and 908. At some point in time, App* 900A may no longer require high-priority service and therefore notify the UE 900B to disable always-on service at 918. As such, in response to determining that no applications running on the UE 900B require always-on service, the UE 900B may not initiate a keep-alive and thereby allow the timer associated with the bearer for the always-on service to expire, whereby the LTE core network 940B and the E-UTRAN core network 940A may deactivate the dedicated bearer and the default bearer at 920 when the bearer availability time expires without receiving a keep-alive message from the UE 900B. At this point, the IP address associated with the supplementary APN may be lost such that data that terminates at the UE 900B cannot be sent to the UE 900B using the supplementary APN, wherein the LTE core network 940B may therefore notify the application server 970 that the bearers to the UE 900B have been deactivated and that the IP address associated with the supplementary APN has been lost. At 924, the UE 900B may then continue to communicate with the LTE core network 940B and/or the E-UTRAN core network 940A over the default APN in a substantially similar manner to that described above with respect to the communication that occurs at 902. During this time, at 926, the application server 970 may send non-priority data that terminates at the UE 900B using the default APN, Cloud to Device Messaging (C2DM), PUSH service, or another suitable non-priority mechanism. Alternatively, the supplementary APN may be reactivated at 928 and activity may be resumed over the supplementary APN in response to the application server 970 receiving high-priority data that terminates at the UE 900B, in response to App* 900A requesting priority service at 930, or in response to the UE 900A otherwise transitioning to a high-priority state.

While the embodiments above have been described primarily with reference to 1xEV-DO architecture in CDMA2000 networks, GPRS architecture in W-CDMA or UMTS networks and/or EPS architecture in LTE-based networks, it will be appreciated that other embodiments can be directed to other types of network architectures and/or protocols.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for optimized always-on wireless service, comprising:
    monitoring requests for always-on service from one or more applications or services on a user equipment (UE) that does not currently have always-on service from a network;
    transmitting, to the network, a message that requests a bearer dedicated to always-on service in response to receiving a request to register for the always-on service from at least one of the one or more applications or services on the UE;
    receiving, at the UE, an availability time that indicates a period during which the bearer dedicated to the always-on service will be held in an active state; and
    transmitting a keep-alive message from the UE to the network before the availability time expires, wherein the keep-alive message comprises information instructing the network to reset the availability time during which the dedicated bearer will be held in the active state without generating a reply message to the UE such that the UE does not receive keep-alive traffic from the network, and wherein the UE maintains the active state associated with the dedicated bearer and notifies the one or more applications or services that have registered for the always-on service to suppress application-layer keep-alive messages.

2. The method recited in claim 1, wherein the UE transmits one keep-alive message to enable all of the one or more applications or services on the UE to utilize the bearer dedicated to the always-on service in the period during which the dedicated bearer will be held in the active state.

3. The method recited in claim 1, further comprising:
receiving, at the UE, an Internet Protocol (IP) address associated with a Packet Data Network Gateway (P-GW) that terminates an interface associated with the dedicated bearer.

4. The method recited in claim 3, further comprising:
receiving an activation message associated with the dedicated bearer from the network, wherein the activation message includes the IP address associated with the P-GW within a Protocol Configuration Option (PCO) information element.

5. The method recited in claim 1, further comprising:
disabling the keep-alive messages on the UE to deactivate the always-on service and the bearer dedicated thereto in response to all of the one or more applications or services that requested the always-on service indicating that the always-on service is no longer required.

6. The method recited in claim 5, further comprising:
transmitting, to the network, a request to reactivate the bearer dedicated to the always-on service in response to the UE transitioning to a high-priority state or another notification from at least one of the one or more applications or services that requests the always-on service; and
receiving, at the UE, an availability time that indicates the period during which the reactivated bearer will be held in the active state.

7. The method recited in claim 5, further comprising:
receiving a high-priority call that terminates at the UE over the bearer dedicated to the always-on service, wherein the network reactivates the bearer dedicated to the always-on service in response to receiving the high-priority call.

8. The method recited in claim 5, further comprising:
receiving a non-priority call that terminates at the UE over a default bearer.

9. The method recited in claim 1, wherein the keep-alive message is communicated over a protocol different from one or more protocols of the always-on service, wherein the protocol of the keep-alive message includes Internet Control Messaging Protocol (ICMP).

10. An apparatus, comprising:
one or more processors configured to monitor requests for always-on service from one or more applications or services on a user equipment (UE) that does not currently have always-on service from a network, to transmit a message that requests a bearer dedicated to always-on service to the network in response to a request to register for the always-on service from at least one of the one or more applications or services on the UE, to receive an availability time that indicates a period during which the bearer dedicated to the always-on service will be held in an active state, and to transmit a keep-alive message from the UE to the network before the availability time expires, wherein the keep-alive message comprises information instructing the network to reset the availability time during which the dedicated bearer will be held in the active state without generating a reply message to the UE such that the UE does not receive keep-alive traffic from the network, and wherein the UE maintains the active state associated with the dedicated bearer and notifies the one or more applications or services that have registered for the always-on service to suppress application-layer keep-alive messages; and
a memory coupled to the one or more processors.

11. A non-transitory computer-readable storage medium having computer-executable instructions recorded thereon, wherein executing the computer-executable instructions on one or more processors causes the one or more processors to:
monitor requests for always-on service from one or more applications or services on a user equipment (UE) that does not currently have always-on service from a network;
transmit, to the network, a message that requests a bearer dedicated to always-on service in response to receiving a request to register for the always-on service from at least one of the one or more applications or services on the UE;
receive, at the UE, an availability time that indicates a period during which the bearer dedicated to the always-on service will be held in an active state; and
transmit a keep-alive message from the UE to the network before the availability time expires, wherein the keep-alive message comprises information instructing the network to reset the availability time during which the dedicated bearer will be held in the active state without generating a reply message to the UE such that the UE does not receive keep-alive traffic from the network, and wherein the UE maintains the active state associated with the dedicated bearer and notifies the one or more applications or services that have registered for the always-on service to suppress application-layer keep-alive messages.

12. A method for optimized always-on wireless service, comprising:
establishing, at a network, a bearer dedicated to an always-on service on a user equipment (UE) in response to receiving a request for always-on service from the UE;
transmitting, to the UE, an availability time that indicates a period during which the bearer dedicated to the always-on service will be held in an active state; and
resetting the period during which the dedicated bearer will be held in the active state without generating a reply message to the UE in response to receiving a keep-alive message from the UE before the availability time expires, wherein the keep-alive message comprises information instructing the network to not send the reply message to the UE such that the network does not send keep-alive traffic to the UE.

13. The method recited in claim 12, further comprising:
routing traffic associated with one or more applications on the UE over the dedicated bearer in the period during which the dedicated bearer will be held in the active state.

14. The method recited in claim 12, further comprising:
transmitting, to the UE, an Internet Protocol (IP) address associated with a Packet Data Network Gateway (P-GW) that terminates an interface associated with the dedicated bearer.

15. The method recited in claim 14, wherein an activation message associated with the dedicated bearer includes the IP address associated with the P-GW within a Protocol Configuration Option (PCO) information element.

16. The method recited in claim 12, further comprising:
deactivating the bearer dedicated to the always-on service in response to determining that the keep-alive message was not received at the network before the availability time expired.

17. The method recited in claim 16, further comprising:
reactivating the bearer for the always-on service in response to the UE transitioning to a high-priority state or requesting activity on the bearer for the always-on service; and
transmitting, to the UE, an availability time that indicates the period during which the reactivated bearer will be held in the active state.

18. The method recited in claim 16, further comprising:
reactivating the bearer for the always-on service in response to receiving a high-priority call that terminates at the UE; and
terminating the high-priority call at the UE over the reactivated bearer.

19. The method recited in claim 16, further comprising:
receiving a non-priority call that terminates at the UE; and
terminating the non-priority call at the UE over a default bearer.

20. The method recited in claim 12, wherein the keep-alive message is communicated over a protocol different from one or more protocols of the always-on service, wherein the protocol of the keep-alive message includes Internet Control Messaging Protocol (ICMP).

21. An apparatus, comprising:
one or more processors configured to establish a bearer dedicated to an always-on service on a user equipment (UE) in response to receiving a request for always-on service from the UE, to transmit an availability time to the UE, wherein the availability time indicates a period during which the bearer dedicated to the always-on service will be held in an active state, and to reset the period during which the dedicated bearer will be held in the active state without generating a reply message to the UE in response to receiving a keep-alive message from the UE before the availability time expires, wherein the keep-alive message comprises information instructing the apparatus to not send the reply message to the UE such that the apparatus does not send keep-alive traffic to the UE; and
a memory coupled to the one or more processors.

22. A non-transitory computer-readable storage medium having computer-executable instructions recorded thereon, wherein executing the computer-executable instructions on one or more processors causes the one or more processors to:
establish, at a network, a bearer dedicated to an always-on service on a user equipment (UE) in response to receiving a request for always-on service from the UE;
transmit, to the UE, an availability time that indicates a period during which the bearer dedicated to the always-on service will be held in an active state; and
reset the period during which the dedicated bearer will be held in the active state without generating a reply message to the UE in response to receiving a keep-alive message from the UE before the availability time expires, wherein the keep-alive message comprises information instructing the network to not send the reply message to the UE such that the network does not send keep-alive traffic to the UE.

23. The method recited in claim 9, wherein the keep-alive message comprises a message type field that has a value corresponding to a reserved field in the ICMP standard.

24. The method recited in claim 1, wherein the network comprises a radio access network (RAN) that supports packet-switched communications, and wherein the keep-alive message is transmitted to a component on the RAN that terminates an interface associated with the dedicated bearer toward the RAN.

25. The method recited in claim 20, wherein the keep-alive message comprises a message type field that has a value corresponding to a reserved field in the ICMP standard.

26. The method recited in claim 12, wherein the network comprises a radio access network (RAN) that supports packet-switched communications, and wherein the keep-alive message is received at a component on the RAN that terminates an interface associated with the dedicated bearer toward the RAN.

* * * * *